Aug. 10, 1926.
F. A. GUDGER
METHOD OF TREATING MICA
Filed Feb. 19, 1924
1,595,088
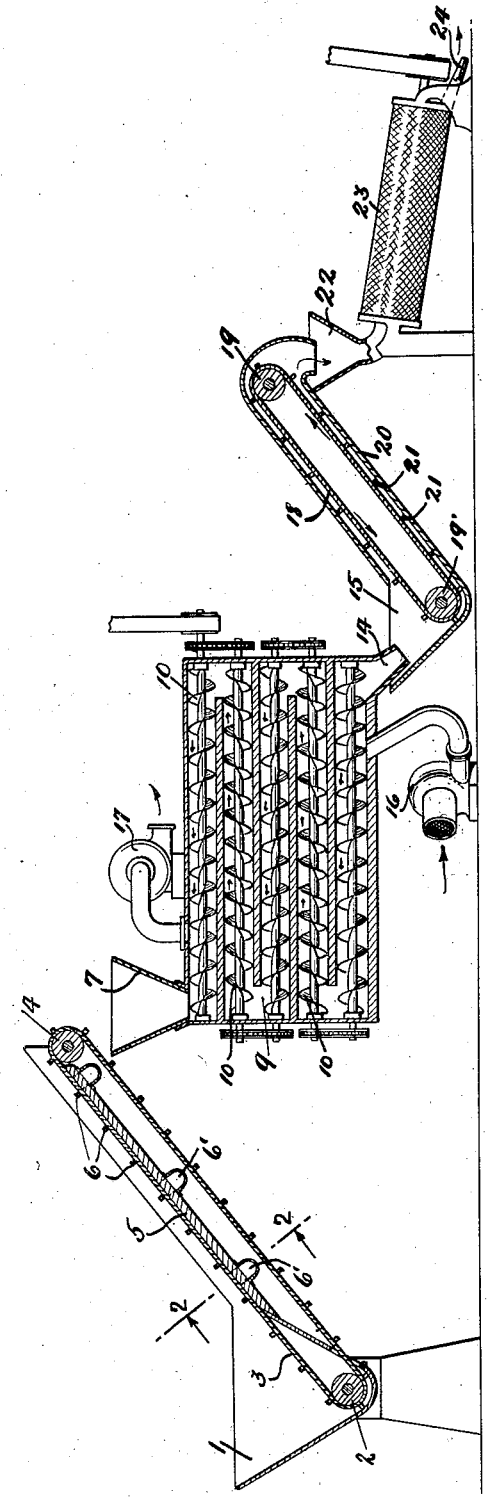
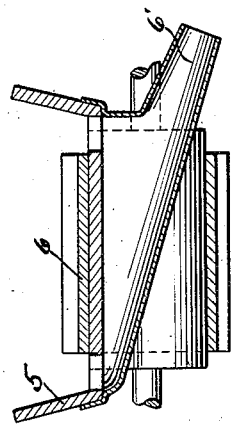
INVENTOR
Francis A. Gudger.
BY
Kiddle and Marqueson
ATTORNEYS.

Patented Aug. 10, 1926.

UNITED STATES PATENT OFFICE.

FRANCIS A. GUDGER, OF NEW YORK, N. Y.

METHOD OF TREATING MICA.

Application filed February 19, 1924. Serial No. 693,823.

My invention relates to an improved method for treating mica, being particularly directed to the drying and cleaning of the same.

One of the objects of my invention is the provision of a method and apparatus whereby the mica in its travel through the apparatus is thoroughly dried and cooled and is finally delivered in such condition to sacks or other containers in which it is packed for shipment.

Another object of my invention is the provision of a method and apparatus for treating the mica whereby during the drying process the gravel, always found in scrap or waste mica, is separated from the mica.

The mica which I have in mind as particularly adaptable for treatment by my improved method comes from the mill in small pieces saturated with water, the water being used for the washing process which is performed prior to treatment by my method.

The difficulty previously encountered in handling this material has been the thorough and efficient drying of the material so that the same could be packed for shipment, and prior to my invention this has been done by scattering the material over the floor and allowing the same to be dried by the sun and air. This method, however, is very slow, requires a large floor space for operation, and is generally unsatisfactory in a commercial sense.

By my improved method, however, the mica is not only dried but cooled in the minimum of time, while the space required for the drying apparatus is also materially reduced—in fact, need not be taken into consideration at all. A further advantage of my improved method is the handling of the mica by machine throughout so that the labor costs are cut down as well.

In the practice of my improved method, the mica as it comes from the mill in its saturated or damp condition is dumped into a hopper from which it is carried upwardly through a trough by a belt which is sufficiently agitated to cause the sand and gravel which is mixed with the mica when scrap mica is being treated to be shaken or jarred out of the mica so that the material which is finally transferred from this conveyer belt into a second hopper is practically nothing but clean mica. Of course, if nothing but clean wet mica were being treated, the first step of my method, as just described, could be eliminated as there would be no foreign matter mixed with the mica requiring removal. The mica after it reaches the end of the first conveyer falls into a second hopper which is located at the top of a battery of drying tubular chambers or cylinders. Each of these chambers is provided with a helical conveyer and each chamber is in communication with its neighbor, while the conveyers are alternately right and left-hand so that after the material has passed through one chamber it falls upon the next lowest conveyers to be carried by it in the opposite direction to its direction of travel through the preceding chamber. In other words, the material passes from left to right and then from right to left alternately until it finally reaches the bottom chamber of the battery from which it discharges into a third hopper. The drying chambers may be heated in any suitable way, as by steam-jacketing, for example, or in any other suitable way which may appeal to one skilled in this art, and to further facilitate the drying operation a blast of heated air may be drawn through the heating chambers during the passage of the material therethrough, this hot air blast traveling in the opposite direction to that of the travel of the material.

I find that mica treated in the manner above outlined, while discharging from the heating battery in a heated and dry condition, is still not ready for packing, moisture forming on each particle of the mica as the same cools. Consequently I transfer the mica from the third hopper to a fourth hopper by means of a conveyer belt running at fairly high speed, this belt or conveyer transporting the material upwardly through an enclosed trough from which it is dumped or discharged into an inclined revolving screen of fine mesh, the material traveling down this screen by gravity to the discharge end thereof. During the passage of the mica from the third hopper to the discharge end of the revolving screen the material is thoroughly cooled so that it may be discharged from the screen directly into sacks or other containers and packed ready for shipment.

It will be seen, therefore, that I have provided a method whereby the mica to be treated may be thoroughly dried in an expeditious and practicable manner with the minimum of handling and with the minimum of floor space, as distinguished from the slow, unsatisfactory methods above referred to wherein not only is a great deal of time consumed in the drying operation, but extensive floor space is required on which the material is spread to be dried by the sun and air.

It will be seen also that I have provided a method and apparatus by which scrap mica may be treated in an expeditious manner and not only dried but separated from any foreign substances, such as sand and gravel, as well.

It is to be understood, and I have attempted to make this point clear in the discussion of my invention, that while I have made particular reference to scrap mica as lending itself to treatment by my method, I am not to be limited to the drying of scrap mica as it must be obvious that I can treat any kind of fairly finely-divided mica, whether the same be what is technically known as "scrap" mica or not.

The type of apparatus which may be employed in the working of my improved method may be varied to suit conditions, but in the accompanying drawings I have illustrated one form of apparatus which I have put into commercial operation and found particularly well adapted for the practice of my method.

In the accompanying drawings—

Figure 1 is a sectional elevational view, more or less diagrammatic, of the apparatus above mentioned which I have employed in the actual drying of scrap mica and Fig. 2 is a section of a part of this apparatus taken on the line 2—2 of Fig. 1.

Referring to the drawings in detail, 1 designates an intake hopper into which is fed the wet mica to be treated. In the bottom of this hopper I mount a pulley 2, carrying a belt conveyer 3, the other end of this conveyer being carried by a similar pulley 4, at the upper end of an inclined trough 5 which is connected to one side of the hopper. The conveyer 3 is provided on its active face at regular intervals with transverse strips or cleats 6 and these cleats carry the material from the hopper to the top of the trough 5 and from thence it falls into a hopper 7. I find in actual practice that the conveyer belt 3 in passing over the pulleys 2 and 4 is agitated sufficiently to cause the sand and gravel which is mixed with the scrap mica to be shaken to the ends of the cleats 6 from which it falls over the sides of the conveyer into catchalls or sumps 6' which may be arranged at intervals along the conveyer, these sumps or catch-alls passing the sand and gravel out of the trough entirely.

The mica has now been freed from sand and gravel and after being dumped into the second hopper 7 which is arranged at the top of the battery 9 of drying cylinders or chambers, passes into the first drying chamber of the battery. Five (5) of these drying chambers have been shown, although the number may be varied as desired. Each chamber contains a helical conveyer 10, and after the material has traversed the first chamber, from left to right as shown in the drawings, it drops into the next chamber immediately below and traverses that chamber in the opposite direction to the direction of travel of the material in the first chamber. The material traverses each individual chamber until it finally reaches the lowest chamber of the battery from which it is discharged through spout 14 into a third hopper 15. As previously indicated, the drying chambers may be steam-jacketed or heated in any other suitable and convenient manner and, if desired, a hot air blast may be passed through the chambers by means of blower 16 and exhaust fan 17, this hot air blast traveling in the opposite direction to that of the mica being dried or treated.

The mica, as it is discharged from the drying battery, is fairly hot and dry, but I find in actual practice that in cooling off moisture will collect on the small particles of the mica. To eliminate this moisture and prepare the mica ready for shipment, I provide a second conveyer 18, one end of which passes into the bottom of the hopper 15, while the other end is passed about a pulley 19 at the upper end of an enclosed trough 20. The lower end of the conveyer 18 passes about a pulley 19' in the bottom of the hopper 15. This conveyer, which is similar in construction to the conveyer 3, is provided with transverse cleats or strips 21, and is driven at fairly high speed and in a direction reverse to that of the conveyer 3, the material being pushed up along the bottom of the trough 20 by the cleats 21, from which it drops into a hopper 22 at the upper end of an inclined, fairly fine mesh, rotary screen 23. The material passes down the screen 23 by gravity and in its travel down the length of this screen, the material is thoroughly dried and cooled so that it may be discharged from the discharge spout 24 of the screen into sacks or other containers in which it is to be packed for shipment.

Having particularly described my invention, what I claim and desire to secure by Letters Patent is:—

1. The method of drying mica, which method consists in heating the mica and thereafter cooling by subjecting the mica to agitation.

2. The method of drying mica, which method consists in elevating the mica and then effecting a descent of the same through a battery or bank of heated chambers, elevating the mica after so heating and finally cooling by effecting a second descent of the mica while subjecting to agitation.

3. The method of drying mica, which method consists in heating the mica by passing the same through a drying chamber against a current of hot air traveling in the opposite direction, and finally cooling the heated mica by subjecting the same to agitation.

4. The method which consists in agitating a moist mixture of mica and foreign material such as sand and gravel, to recover the mica, thereafter heating the recovered mica, and finally passing the heated mica over an incline reticulated, agitated, surface to effect thorough cooling of the mica.

This specification signed this 14th day of February, 1924.

FRANCIS A. GUDGER.